(12) United States Patent
Sparling et al.

(10) Patent No.: US 8,779,624 B2
(45) Date of Patent: Jul. 15, 2014

(54) METHODS AND SYSTEMS FOR BRANCH ENCODING IN AN ELECTRIC NETWORK

(75) Inventors: Steven Sparling, Fife (GB); Stuart Gilmour, Lanarkshire (GB)

(73) Assignee: General Electric Company, Schenectady, NY (US)

( * ) Notice: Subject to any disclaimer, the term of this patent is extended or adjusted under 35 U.S.C. 154(b) by 264 days.

(21) Appl. No.: 13/252,329

(22) Filed: Oct. 4, 2011

(65) Prior Publication Data
US 2013/0082524 A1    Apr. 4, 2013

(51) Int. Cl.
*H02J 4/00*    (2006.01)
(52) U.S. Cl.
USPC ............................................................ 307/19
(58) Field of Classification Search
None
See application file for complete search history.

(56) References Cited

U.S. PATENT DOCUMENTS

| | | | |
|---|---|---|---|
| 7,830,819 B2 * | 11/2010 | Yamamuka et al. | 370/254 |
| 7,961,740 B2 | 6/2011 | Flammer, III et al. | |
| 2010/0217550 A1 | 8/2010 | Crabtree et al. | |
| 2011/0176416 A1 | 7/2011 | Bhatti et al. | |
| 2011/0196546 A1 | 8/2011 | Muller et al. | |
| 2012/0112713 A1 * | 5/2012 | Kuehn | 323/207 |

FOREIGN PATENT DOCUMENTS

WO    WO 2010119136 A1 *  10/2010 ................ H02J 3/24

* cited by examiner

*Primary Examiner* — Rexford Barnie
*Assistant Examiner* — Daniel Kessie
(74) *Attorney, Agent, or Firm* — Armstrong Teasdale LLP

(57) ABSTRACT

Methods and systems for branch encoding an electric network to identify a direction of power flow in the electric network are provided. Sequential numbers are assigned to a first power source, each one of a plurality of power branches, and each one of a plurality of nodes. A rationalized value indicative of a direction of current flow through a branch is assigned to each branch of the plurality of branches. The rationalized value of each branch is determined as the difference between the numbers assigned to that branch's first connecting node and its second connecting node.

20 Claims, 6 Drawing Sheets

US 8,779,624 B2

METHODS AND SYSTEMS FOR BRANCH ENCODING IN AN ELECTRIC NETWORK

BACKGROUND OF THE INVENTION

The embodiments described herein relate generally to electric power generation and delivery systems and, more particularly, to systems and methods for use in branch encoding in a utility network.

Power generated by an electric utility is typically delivered to a customer via an electric grid. The electric power generation and delivery system is closely monitored and controlled by an electric grid control system that includes a large number of individual subsystems, which may also include multiple components. Typically, information is transmitted from many of the subsystems/components to the control system for use in controlling operation of the electric grid. For example, some power utilities utilize what is referred to as a "smart grid."

Known smart grids include a plurality of components and subsystems that communicate with a central management system, typically located at the utility. The components and subsystems may be distributed at various points in the utility network to facilitate power distribution. Due at least in part to the large scale of a smart grid, and the quantity of individual component/subsystems that may be included in the smart grid, information at the management system, for use in centralized management of the smart grid, is generally expansive and complex. In general, users of the management system have to individually locate, select, and display each portion of target information to separate screens or windows. Accordingly, such data management systems may be cumbersome and/or time consuming.

BRIEF DESCRIPTION OF THE INVENTION

In one aspect, a method of branch encoding an electric network to identify a direction of power flow in the electric network is provided. The method includes assigning sequential numbers to a first power source of the electric network, each one of a plurality of connecting nodes of the electric network, and each one of a plurality of power branches extending between different pairs of the plurality of nodes. E each branch includes an encoded identification of a first connecting node and a second connecting node between which it extends and to which it is connected. The sequential numbers begin with the power source. The method includes assigning a rationalized value to each branch of the plurality of branches. The rationalized value is indicative of a direction of current flow through a branch. The rationalized value of each branch is determined as the difference between the numbers assigned to that branch's first connecting node and its second connecting node.

In another aspect, a system for use in branch encoding an electric network is provided. The system includes a processor and a non-transitory computer readable medium coupled with said processor. The non-transitory computer readable medium contains instructions that, when executed by the processor, cause said processor to assign sequential numbers to a first power source of the electric network, each one of a plurality of connecting nodes of the electric network, and each one of a plurality of power branches extending between different pairs of the plurality of nodes. Each branch includes an encoded identification of a first connecting node and a second connecting node between which it extends and to which it is connected. The sequential numbers begin with the power source. The rationalized value is indicative of a direction of current flow through a branch and is determined as the difference between the numbers assigned to that branch's first connecting node and its second connecting node.

In another aspect, a computer program embodied on a non-transitory computer readable medium for branch encoding an electric network is provided. The program includes at least one code segment that assigns sequential numbers to a first power source of the electric network, each one of a plurality of connecting nodes of the electric network, and each one of a plurality of power branches extending between different pairs of the plurality of connecting nodes. Each branch includes an encoded identification of a first connecting node and a second connecting node between which it extends and to which it is connected. The sequential numbers begin with the power source. The rationalized value is indicative of a direction of current flow through a branch. The rationalized value of each branch is determined as the difference between the numbers assigned to that branch's first connecting node and its second connecting node.

DETAILED DESCRIPTION OF THE INVENTION

The following detailed description illustrates exemplary embodiments of the invention by way of example and not by way of limitation. It is contemplated that the invention has general application to analytical and methodical embodiments of managing operation and maintenance of widely geographically diverse power assets in industrial, commercial, and residential applications.

Exemplary embodiments of the methods and systems described herein relate to identifying a direction of power flow in an electric network. More particularly, the embodiments relate to branch encoding an electric network to identify a direction of power flow in the electric network.

The methods and systems described herein may be implemented using computer programming or engineering techniques including computer software, firmware, hardware or any combination or subset thereof, wherein an exemplary technical effect may include at least one of: (a) assigning sequential numbers to a first power source, each one of a plurality of power branches, and each one of a plurality of nodes, and (b) assigning a rationalized value to each branch of the plurality of branches. The rationalized number is indicative of a direction of power flow through a branch and is determined as the difference between the numbers assigned to that branch's first connecting node and its second connecting node.

Figure 1:
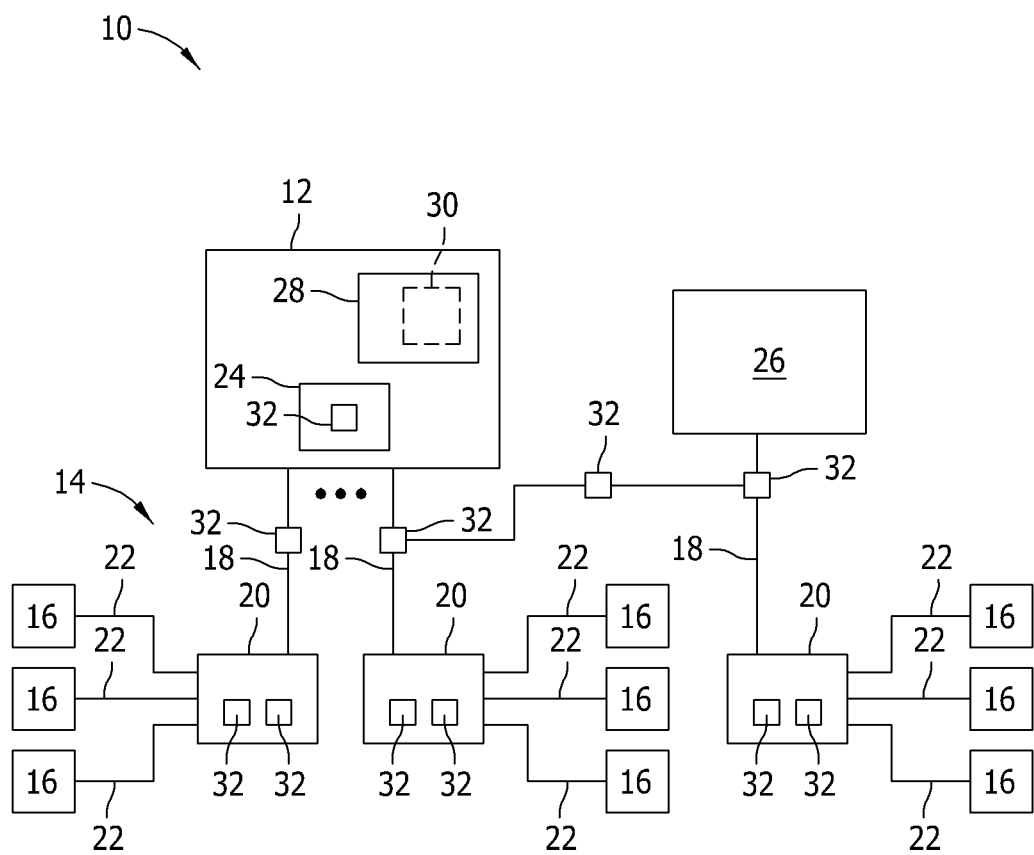
FIG. 1 is a block diagram of an exemplary electric power generation and delivery system.

FIG. 1 is a block diagram of an exemplary electric power generation and delivery system 10. In the exemplary embodiment, electric power generation and delivery system 10 includes an electric utility 12, electric grid 14, and a plurality of customer or energy user locations 16. Moreover, in the exemplary embodiment, electricity is delivered from electric utility 12 to customer or energy user locations 16 via electric grid 14. More specifically, electric grid 14 includes a plurality of transmission lines 18, a plurality of electric substations 20, and a plurality of distribution lines 22 that enable distribution of electricity. Moreover, in the exemplary embodiment, electric utility 12 includes an electric power generation system 24 that supplies electrical power to electric grid 14. Electric power generation system 24 may include a generator driven by, for example, a gas turbine engine, a hydroelectric turbine, a wind turbine, one or more solar panels, and/or another suitable generation system. In the exemplary embodiment, system 10 includes an additional power source 26. Additional power source 26 may include a generator driven by, for example, a gas turbine engine, a hydroelectric turbine, a wind turbine, one or more solar panels, and/or another suitable power generation system. Additional power source 26 may belong to (e.g. be owned by) electric utility 12 or may belong to, or be a part of, a different electric utility.

In the exemplary embodiment, grid 14 is a meshed network including multiple power sources, power generation system 24 and additional power source 26. In other embodiments, grid 14 may be a radial network including a single power source such as power generation system 24 or additional power source 26.

In the exemplary embodiment, electric utility 12 also includes a distribution control center substation 28 that facilitates control of energy production and/or delivery. Distribution control center substation 28 is illustrated as being included within electric utility 12, however, distribution control center substation 28 may be external to electric utility 12 (e.g., remotely located, etc.) and in communication with electric utility 12. Moreover, distribution control center substation 28 may be and in communication with additional power source 26, whether located internal or external to additional power source 26.

In the exemplary embodiment, distribution control center substation 28 includes a management system 30 that provides operator control for managing power delivered from electric power generation system 24 and/or distributed into electric grid 14. Management system 30 may control distribution to electrical substations 20, to customer or energy user locations 16, and/or other suitable point within electric grid 14. Management system 30 may be usable to detect operating conditions in the electric grid 14, alter a configuration of grid 14, and/or other operations associated with electric grid 14 and/or electric power generation system 24. Specifically, in the exemplary embodiment, management system 30 is coupled to a plurality of switchable assets 32 distributed throughout system 10.

In one example, management system 30 may be employed to rapidly respond to outage/fault conditions to reconfigure to electric grid 14, via one or more switchable assets 32 (sometimes referred to herein as switches 32), in an effort to limit potential safety issues, to control power distribution, and/or to limit damage to/from electric grid 14. In another example, to enable the installation of equipment or the replacement of existing equipment, a switch plan may be provided to safely de-energize a section of conductor prior to performing the work. Management system 30 may determine a switch plan and create a planned outage order associated with the switch plan. Management system 30 may also be configured to simulate the switch plan in order to ensure accuracy, safety, and effectiveness of the switch plan. The availability of work crews and tools necessary to perform a desired maintenance/repair may also be coordinated by management system 30. Specifically, management system 30 may be useable by a dispatcher or a network operator to dispatch work crews and tools to appropriate locations, and/or to coordinate switch plans to minimize impact on operation of electric grid 14.

In at least one embodiment, management system 30 may include a supervisory control and data acquisition (SCADA) component, such as the SCADA Energy Management System commercially available from General Electric Company. Specifically, management system 30 may include a user interface that enables a user, such as such as dispatcher, a network operator, utility engineer, a systems engineer, a transmission engineer, etc., to manage electric grid 14.

Figure 2:
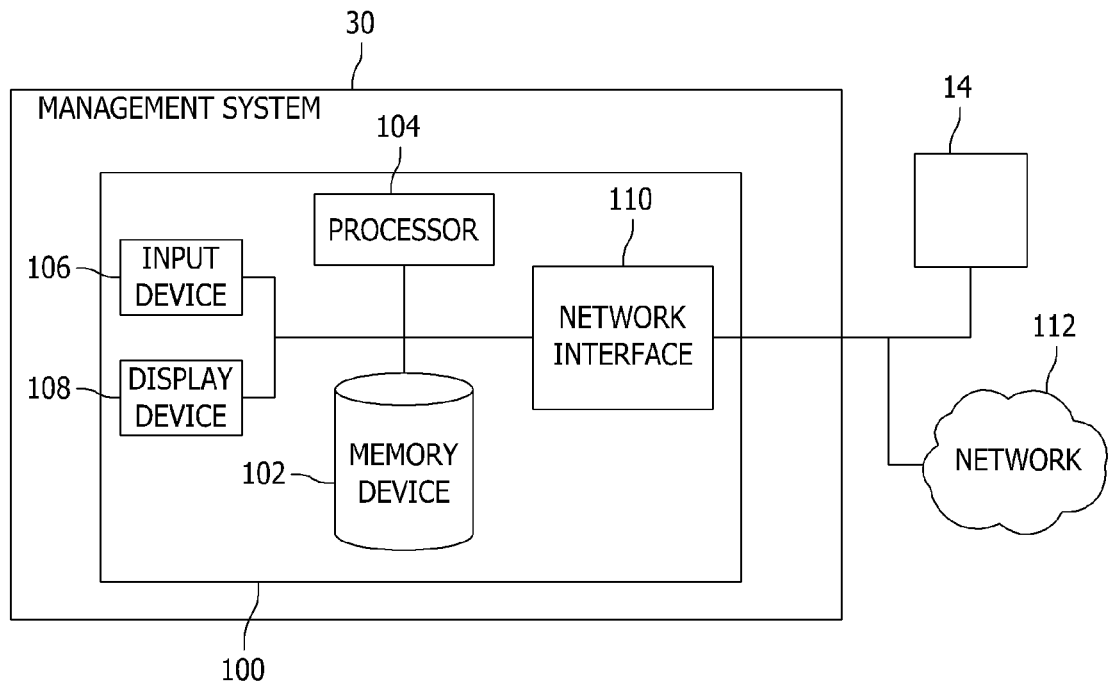
FIG. 2 is a block diagram of an exemplary management system that may be used to manage the electric power generation and delivery system shown in FIG. 1.

FIG. 2 is an exemplary block diagram of management system 30. In the exemplary embodiment, management system 30 includes a computing assembly 100. Computing assembly 100 may include a personal computer, a workstation, a server, a network computer, a mobile computer, a portable digital assistant (PDA), a smartphone, or other suitable device. As illustrated, computing assembly 100 includes a display device 108, a memory device 102 and a processor 104 in communication with display device 108 and memory device 102. Display device 108 may include, without limitation, a cathode ray tube (CRT) display, a liquid crystal display (LCD), an organic light emitting diode (OLED) display, or other suitable device for use in presenting information to a user (not shown).

Memory device 102 is any suitable device that may be used for storing and/or retrieving information, such as executable instructions and/or data. Memory device 102 may include any computer readable medium, such as hard disk storage, optical drive/disk storage, removable disk storage, flash memory, random access memory (RAM), etc. While memory device 102 is illustrated as a single element in FIG. 2, it should be appreciated that memory device 102 may include one or multiple separate memory devices, located together or remote from one another.

Processor 104 may include one or more processing units (e.g., in a multi-core configuration). The term processor, as used herein, refers to central processing units, microprocessors, microcontrollers, reduced instruction set circuits (RISC), application specific integrated circuits (ASIC), logic circuits, and any other circuit or processor capable of executing instructions. Processor 104 may be programmed to perform alone or in combination any of the processes, methods or functions described herein.

Computing assembly 100 includes an input device 106 for receiving input from user. Input device 106 may include, without limitation, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both display device 108 and input device 106. Further, the particular example embodiment of FIG. 2, computing assembly 100 includes a network interface 110. Network interface 110 may provide communication between computing assembly 100 and electric grid 14 and/or one or more public networks 112, such as Internet, Intranet, a local area network (LAN), a cellular network, a wide area network (WAN), etc.

As described above, grid 14 may be configured and/or reconfigured, for example by use of switchable assets 32. When grid 14 is reconfigured, the flow of current and power, through grid 14 may change. For example, power through one branch of grid 14 may be provided by a different power source and/or flow in a different direction following a change in the configuration of grid 14. Accordingly, management system 30 is configured, such as by programming stored in memory device 102, to remotely determine the direction of current and power flow through the branches of grid 14 based on the current grid configuration. As used herein, a "branch" (sometimes also referred to herein as a "power branch") includes any wire, cable, transmission line, etc. between two points of an electric grid, such as grid 14. The points of the grid between which a branch extends are generally referred to herein a "nodes". A node may include a switch (such as switchable assets 32), a transformer, a connection to another branch, an energy user location 16, a power source (such as power generation system 24 or additional power source 26), or any other suitable point on the grid.

Figure 3:
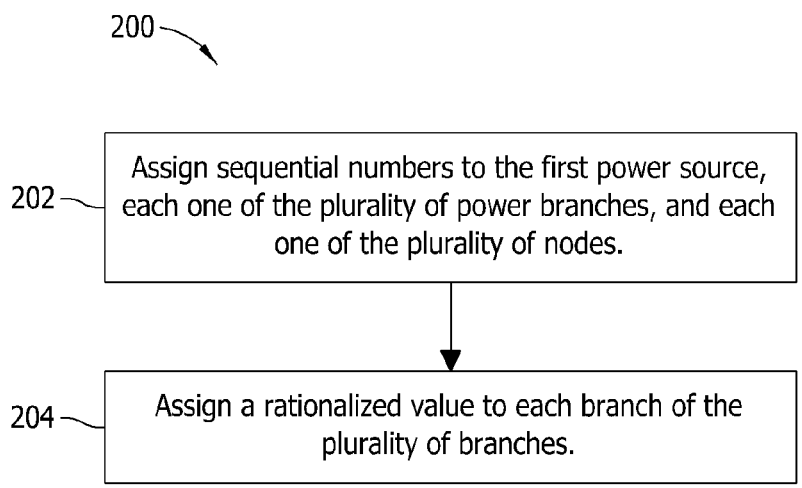
FIG. 3 is a block diagram of an exemplary method that may be used to branch encode an electric network shown in FIG. 1.

FIG. 3 is a flow diagram of an exemplary method 200 of branch encoding a network diagram (not shown in FIG. 3) of an electric network, such as electric grid 14. The electric network includes a first power source, a plurality of power branches, and a plurality of nodes. Each branch extends between a first node of the plurality of nodes and a second node of the plurality of nodes. Each branch is encoded with an identification of its first node and its second node. Sequential numbers are assigned 202 to the first power source, each one of the plurality of power branches, and each one of the plurality of nodes, with the sequential numbers beginning with the power source. A rationalized value is assigned 204 to each branch of the plurality of branches. The rationalized number is indicative of a direction of current flow through a branch and is determined as the difference between the numbers assigned to a branch's first connecting node and its second connecting node. It should be appreciated that the methods described herein may be applied to a wide variety of electric grids and, therefore, are not limited to electric grid 14 or management system 30. Likewise, electric grid 14 and management system 30 should not be understood to be limited to the methods disclosed herein.

Method 200 will be explained in more detail with reference to FIGS. 4-7. FIGS. 4-7, and method 200, are described with reference to electric grid 14 and management system 30. It should be appreciated, however, that the methods described herein may be applied to a wide variety of electric grids and, therefore, are not limited to electric grid 14 or management system 30. Likewise, electric grid 14 and management system 30 should not be understood to be limited to the methods disclosed herein. Furthermore, it should be understood that method 200 may be implemented without any visual representation of an electric grid such as is shown in FIGS. 4-7. For example, system 30 may store data describing electric grid 14 and its interconnections without reliance on, or reference to, any visual representation of grid 14. Further, as used herein, "sequential numbers" are numbers having a regular sequence. In the example below, the sequential numbers begin at zero and increment by one. In other embodiments, the sequence may begin at any other number and any other sequence suitable for the methods and systems described herein may be used. For example, the sequence may include successive odd numbers, successive even numbers, successive prime numbers, numbers incremented by threes, etc.

Figure 4:
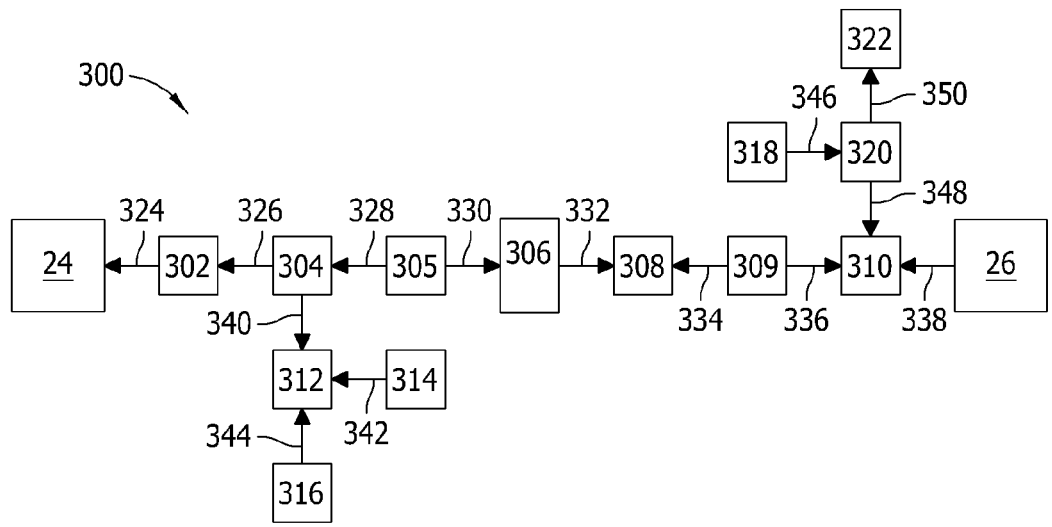
FIG. 4 is a simplified network diagram on which the method shown in FIG. 3 can be performed.

FIG. 4 is a network diagram 300 of a portion of electric grid 14. Diagram 300 includes a plurality of nodes 302-322. In the exemplary embodiment, network diagram 300 includes electric power generation system 24 and additional power source 26, which are also considered nodes of electric grid 14. Diagram 300 also includes a plurality of power branches 324-350. Power branches 324-350 extend between pairs of nodes 302-322, 24, and 26 on electric grid 14.

In FIG. 4, the arrows on branches 324-350 indicate the direction in which the branches 324-350 were drawn and may be arbitrarily assigned and/or may be based on a previous configuration of grid 14. In the exemplary embodiment, this does not indicate any known relation to the direction of the power flow through any of the branches 324-350. Branches 324-350 are drawn from a first connecting node to a second connecting node at which the arrow points. For example, branch 326 has node 304 as its first connecting node and node 302 as its second connecting node. Hence, branch 326 is shown with an arrow pointing toward node 302, its second connecting node. In the exemplary embodiment, branches 324-350 are stored in memory device 102 along with their properties for the first connecting node and the second connecting node.

Figure 5:
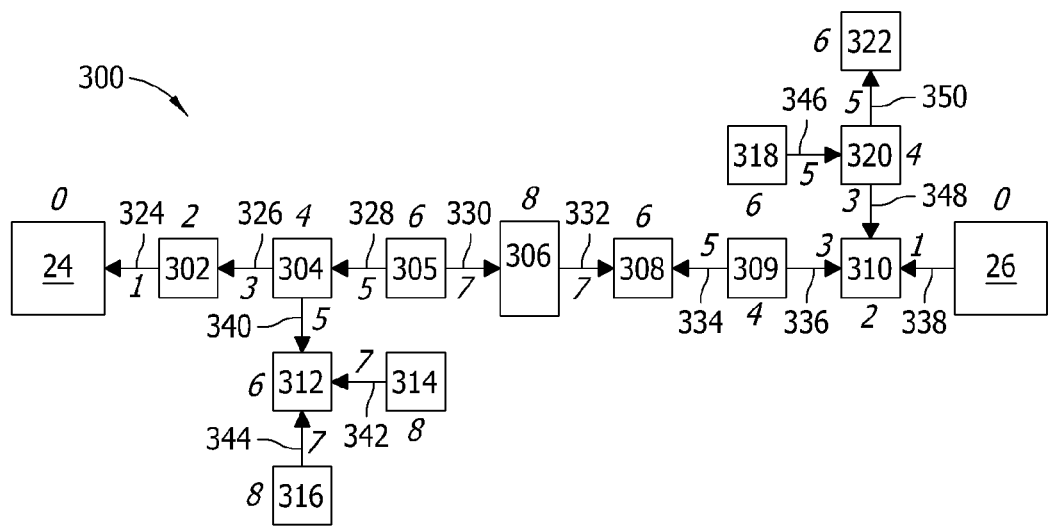
FIGS. 5-7 illustrate an exemplary application of the method shown in FIG. 3 on the network diagram shown in FIG. 4.

Method 200 may be implemented in two passes. The first pass involves a breadth first traversal from all power sources numbering all nodes and branches starting at zero and incrementing by 1 and stopping at open switches. The sequential numbering continues until an open switch and/or a node 302-322 with no other branches 324-350 connected to it is found. The result is an even number assigned to each node 302-322 and an odd number for each branch 324-350 as shown in FIG. 5. In the exemplary embodiment, node 306 is an open switch. Accordingly, for the side of diagram 300 to the left of node 306, electric power generation system 24 is assigned a value of 0, branch 324 is assigned a value of 1, node 302 is assigned a value of 2, branch 326 is assigned a value of 3, and node 304 is assigned a value of 4. Branches 328 and 340, which are both connected to node 304, are both assigned a value of 5. Nodes 305 and 312 are both assigned a value of 6, branches 330, 344, and 342 are all assigned a value of 7, and nodes 306, 314, and 316 are assigned values of 8. At this point an open switch (i.e., node 306) has been reached and this sequential numbering does not extend to branches 332-350 and nodes 308-310 and 318-322 beyond the open switch (e.g., to the right of node 306 in FIGS. 4-7). As there are no unlabeled nodes or branches connected to the labeled nodes 302-305 and 312-316 and branches 324-330 and 340-344, sequential numbering for the nodes and branches connected to electric power generation system 24 ceases. The process is repeated beginning with additional power source 26. The results of the first pass are shown in FIG. 5, with the number assigned to each element being reproduced adjacent the element. In this example, node 306 was assigned a value of 8 relative to both of branches 330 and 332. In other examples, an open switch may be assigned different values relative to different branches. For example, if there were an additional node and branch directly between nodes 306 and 308, node 306 would have been assigned a value of 10 relative to the path on the right side of node 306 in FIG. 5, but would still have a value of 8 with respect to the path on the left side of node 306.

Figure 6:
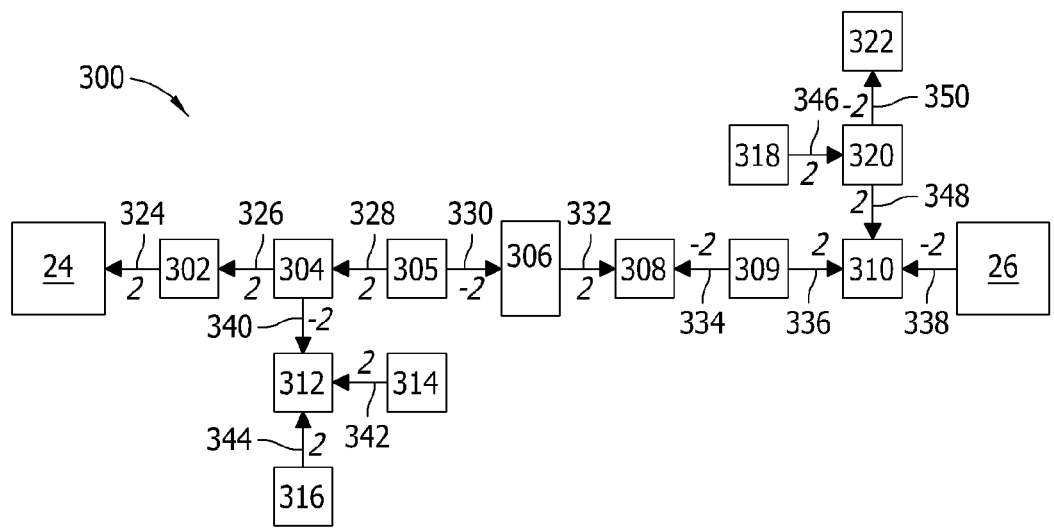

In the second pass, the value assigned to each branch 324-350 is rationalized to a value relative to its nodes 302-322. In the exemplary embodiment, the rationalization is accomplished by subtracting the second connecting node value from the first connecting node value for each branch 324-350. As a result, each branch 324-350 will have a rationalized value of −2 or +2 as shown in FIG. 6. For example, branch 326 has node 304, with a value of 4, as first connecting node and node 302, with a value of 2, as its second connecting node. Subtracting the second connecting node value of 2 from the first connecting node value of 4 results in branch 326 having a rationalized value of 2. In contrast, branch 340 has node 304, with a value of 4, as its first connecting node and node 322, with a value of 6, as its second connecting node, resulting in a rationalized value of −2. A value of −2 indicates that the first connecting node is upstream (i.e., closer to the power source), while a value of +2 indicate that the first connecting node is downstream (i.e., farther from the power source). A value of −2 may also be considered to indicate that power flows in same direction that the branch 324-350 was drawn (e.g., in FIGS. 4-6) and a value of +2 indicates power flows in the opposite direction to the way the branch 324-350 was drawn. After the values assigned to branches 324-350 are rationalized, the values for each node are discarded 302-322.

Figure 7:
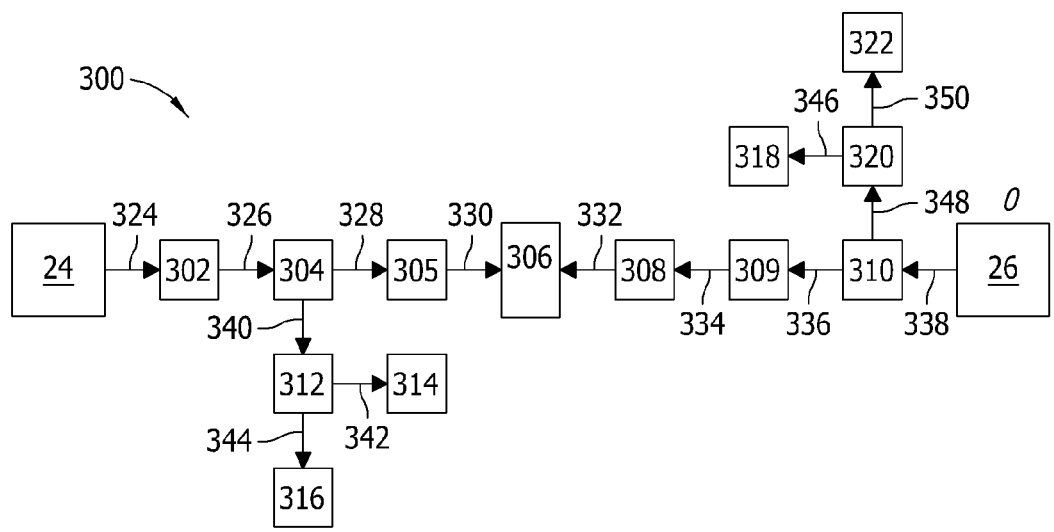
Figure 8:
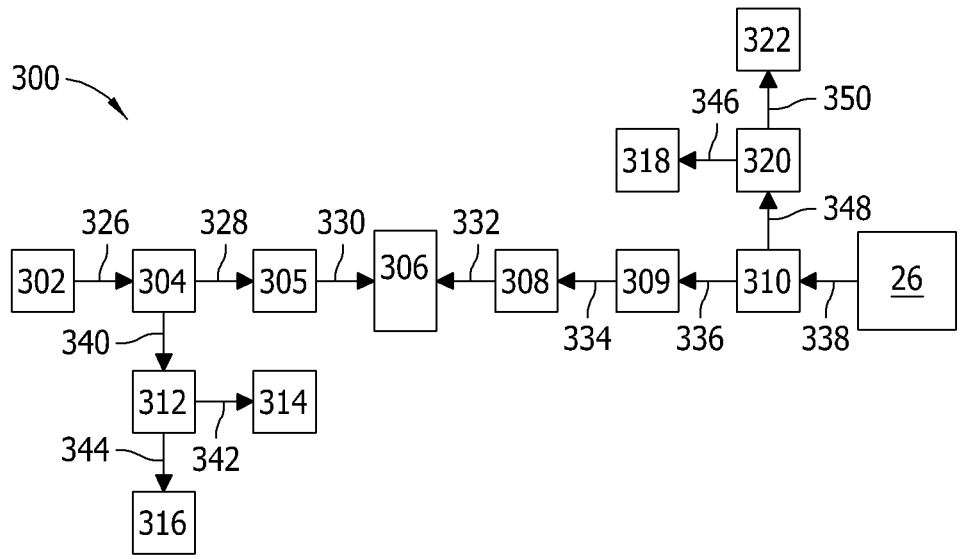
FIG. 8 is the network diagram shown in FIG. 7 after a reconfiguration event has occurred.

The rationalized value assigned to each branch 324-350 is stored or encoded against each branch cable 324-350, for example in memory device 102. Thus, the directionality of power flow in grid 14 may be established for each branch 324-350 as shown in FIG. 7. In some embodiments, management system 30 generates a revised network diagram, similar to network diagram 300 in FIG. 7, showing the direction of power flow in grid 14.

Figure 9:
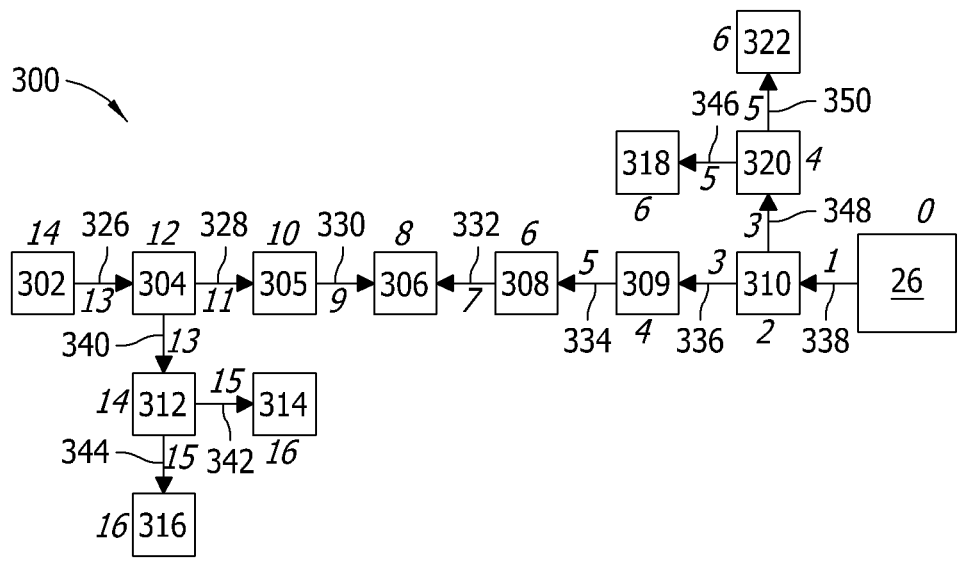
FIGS. 9-11 illustrate an exemplary application of the method shown in FIG. 3 on the network diagram shown in FIG. 8.
Figure 10:
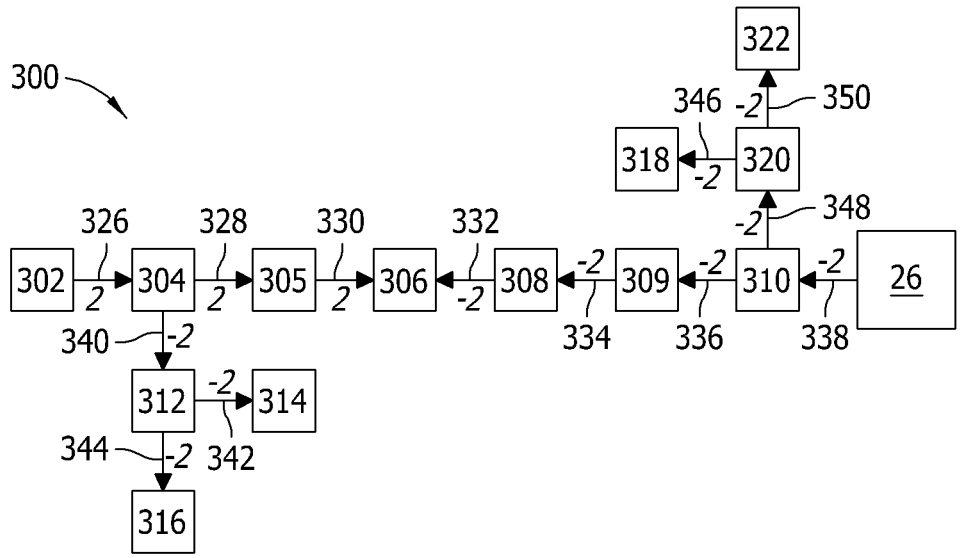
Figure 11:
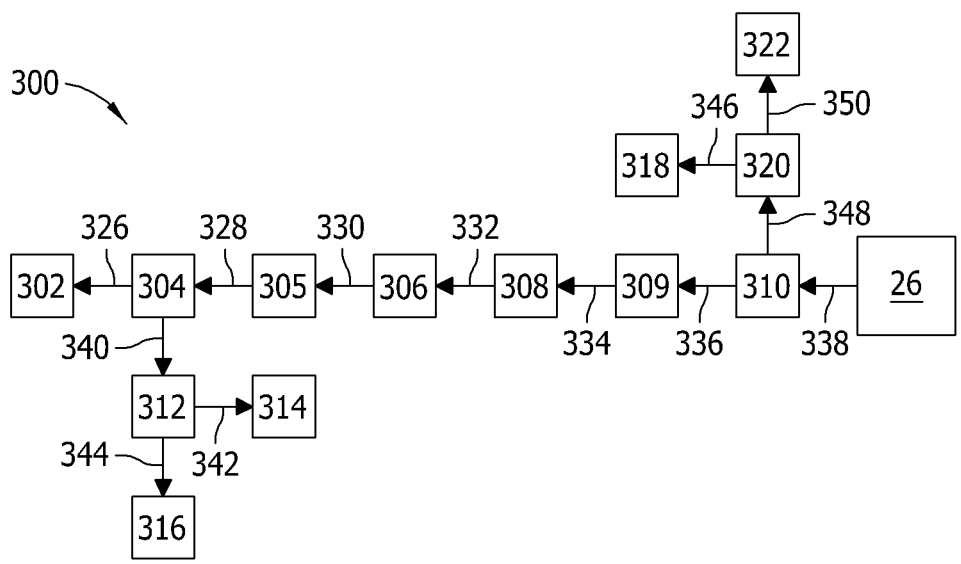

If grid 14 is changed, such as by changing the state of one or more switch 32, method 200 may be performed to identify the changed flow of power in grid 14. For example, if electric power generation system 24 is disconnected from grid 14 and switch 306 is closed, the power flow illustrated in FIG. 7 may not be correct. FIGS. 8-11 illustrate application of method 200 to network diagram 300 from FIG. 7 after such a change. Electric power generation system 24 is now an open switch. For simplicity, electric power generation system 24 is removed from network diagram 300 in FIGS. 8-11. Method 200 is performed beginning with the reconfigured network diagram 300 in FIG. 8. FIG. 9 shows the results of the sequentially numbering, FIG. 10 shows the rationalized values applied to diagram 300, and FIG. 11 illustrates network diagram 300 with power flow directions corrected based on the rationalized values of FIG. 10.

The above-described embodiments of a method and system of branch encoding an electric network provide fast on-demand tracing in an upstream or downstream direction. The methods and systems described herein may provide efficient tracing without need for additional sensors, processing, or further tracing. Moreover, the methods and systems described herein may be used in conjunction with other analytical tools.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method of branch encoding an electric network to identify a direction of power flow in the electric network, said method using a computing device having a processor communicatively coupled to a memory, said method comprising:

assigning sequential numbers to a first power source of the electric network, to each one of a plurality of connecting nodes of the electric network, and to each one of a plurality of power branches extending between different pairs of the plurality of nodes, wherein each branch is a direct connection between a pair of nodes, wherein each branch includes an encoded identification of a first connecting node and a second connecting node between which it extends and to which it is connected, and wherein said sequential numbers begin with the power source; and assigning, by the computing device, a rationalized value to each branch of the plurality of branches, the rationalized value being indicative of a direction of current flow through a branch, the rationalized value of each branch with current flow in a first direction is equal to the negative of the rationalized value of each branch with current flow in a second direction that is opposite of the first direction.

2. A method in accordance with claim 1, further comprising:

generating a network diagram indicating a direction of power flow through the electric network based at least in part on the rationalized value assigned to each branch of the plurality of branches.

3. A method in accordance with claim 1, wherein said assigning sequential numbers comprises assigning a zero to the power source.

4. A method in accordance with claim 3, wherein said assigning sequential numbers comprises assigning successive odd numbers to the plurality of power branches in order of increasing number of branches from the power source.

5. A method in accordance with claim 4, wherein said assigning sequential numbers comprises assigning successive even numbers to the plurality of connecting nodes in order of increasing number of nodes from the power source.

6. A method in accordance with claim 1, wherein the plurality of nodes comprise at least one switch, and wherein said assigning sequential numbers comprises ceasing to assign sequential numbers along a path of the electric network after a switch that is open is assigned a number.

7. A method in accordance with claim 6, wherein the electric network comprises a second power source, a plurality of power branches coupled to the second power source, and a plurality of nodes coupled to the plurality of power branches coupled to the second power source, and wherein said method further comprises assigning sequential numbers to the second power source, to each one of the plurality of power branches coupled to the second power source, and to each one of the plurality of nodes coupled to the plurality of power branches coupled to the second power source, said sequential numbers beginning with the second power source.

8. A system for use in branch encoding an electric network, said system comprising:

a processor; and a non-transitory computer readable medium coupled with said processor and containing instructions that, when executed by said processor, cause said processor to:

assign sequential numbers to a first power source of the electric network, to each one of a plurality of connecting nodes of the electric network, and to each one of a plurality of power branches extending between different pairs of the plurality of nodes, wherein each branch is a direct connection between a pair of nodes, wherein each branch includes an encoded identification of a first connecting node and a second connecting node between which it extends and to which it is connected, and wherein said sequential numbers begin with the power source; and assign a rationalized value to each branch of the plurality of branches, the rationalized value being indicative of a direction of current flow through a branch, the rationalized value of each branch with current flow in a first direction is equal to the negative of the rationalized value of each branch with current flow in a second direction that is opposite of the first direction.

9. A system in accordance with claim 8, wherein said non-transitory computer readable medium contains instructions that, when executed by said processor, cause said processor to generate a network diagram indicating a direction of power flow through the electric network based at least in part on the rationalized value assigned to each branch of the plurality of branches.

10. A system in accordance with claim 8, wherein said non-transitory computer readable medium contains instructions that, when executed by said processor, cause said processor to assign a zero to the power source.

11. A system in accordance with claim 10, wherein said non-transitory computer readable medium contains instructions that, when executed by said processor, cause said processor to assign successive odd numbers to the plurality of power branches in order of increasing number of branches from the power source.

12. A system in accordance with claim 11, wherein said non-transitory computer readable medium contains instructions that, when executed by said processor, cause said processor to assign successive even numbers to the plurality of connecting nodes in order of increasing number of nodes from the power source.

13. A system in accordance with claim 8, wherein the plurality of nodes comprise at least one switch, and wherein said non-transitory computer readable medium contains instructions that, when executed by said processor, cause said processor to cease to assign sequential numbers along a path of the electric network after a switch that is open is assigned a number.

14. A system in accordance with claim 8, wherein the electric network comprises a second power source, a plurality of power branches coupled to the second power source, and a plurality of nodes coupled to the plurality of power branches coupled to the second power source, and wherein said non-transitory computer readable medium contains instructions that, when executed by said processor, cause said processor to assign sequential numbers to the second power source, to each one of the plurality of power branches coupled to the second power source, and to each one of the plurality of nodes coupled to the plurality of power branches coupled to the second power source, said sequential numbers beginning with the second power source.

15. A system in accordance with claim 8, further comprising a display device, and wherein said non-transitory computer readable medium contains instructions that, when executed by said processor, cause said processor to display on the display device a visual representation of the electric network.

16. A system in accordance with claim 15, wherein said non-transitory computer readable medium contains instructions that, when executed by said processor, cause said processor to display on the display device an indication of a direction of power flow through the electric network based at least in part on the rationalized values.

17. A computer program embodied on a non-transitory computer readable medium for branch encoding an electric network, said program comprising at least one code segment that:
assigns sequential numbers to a first power source of the electric network, to each one of a plurality of connecting nodes of the electric network, and to each one of a plurality of power branches extending between different pairs of the plurality of nodes, wherein each branch is a direct connection between a pair of nodes, wherein each branch includes an encoded identification of a first connecting node and a second connecting node between which it extends and to which it is connected, and wherein said sequential numbers begin with the power source; and
assigns a rationalized value to each branch of the plurality of branches, the rationalized value being indicative of a direction of current flow through a branch, the rationalized value of each branch with current flow in a first direction is equal to the negative of the rationalized value of each branch with current flow in a second direction that is opposite of the first direction.

18. A computer program in accordance with claim 17, further comprising at least one code segment that assigns successive odd numbers to the plurality of power branches in order of increasing number of branches from the power source.

19. A computer program in accordance with claim 18, further comprising at least one code segment that assigns successive even numbers to the plurality of connecting nodes in order of increasing number of branches from the power source.

20. A computer program in accordance with claim 17, further comprising at least one code segment that generates a network diagram indicating a direction of power flow through the electric network based at least in part on the rationalized value assigned to each branch of the plurality of branches.

\* \* \* \* \*